(12) United States Patent
Miyashita et al.

(10) Patent No.: US 6,486,581 B2
(45) Date of Patent: Nov. 26, 2002

(54) INTERIOR PERMANENT MAGNET SYNCHRONOUS MOTOR

(75) Inventors: Toshihito Miyashita, Tokyo (JP); Satoru Onodera, Tokyo (JP); Manabu Matsushita, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 09/822,999

(22) Filed: Mar. 30, 2001

(65) Prior Publication Data

US 2001/0028201 A1 Oct. 11, 2001

(30) Foreign Application Priority Data

Mar. 31, 2000 (JP) .......................................... 2000-099946

(51) Int. Cl.⁷ .......................... H02K 21/12; H02K 21/26
(52) U.S. Cl. ........................... 310/156.53; 310/156.01; 310/156.38; 310/156.32; 310/156.56; 310/156.48
(58) Field of Search .................. 310/156.53, 156.54, 310/156.56, 156.57, 156.38

(56) References Cited

U.S. PATENT DOCUMENTS

| | | | | |
|---|---|---|---|---|
| 5,811,904 A | * | 9/1998 | Tajima et al. | 310/156 |
| 5,886,440 A | * | 3/1999 | Hasebe et al. | 310/156 |
| 5,990,592 A | * | 11/1999 | Miura et al. | 310/156 |
| 6,034,459 A | * | 3/2000 | Matsunobu et al. | 310/156 |
| 6,127,764 A | * | 10/2000 | Torok | 310/269 |
| 6,133,662 A | * | 10/2000 | Matsunobu et al. | 310/156 |
| 6,147,428 A | * | 11/2000 | Takezawa et al. | 310/156 |

FOREIGN PATENT DOCUMENTS

| | | |
|---|---|---|
| JP | 8-205499/1996 | 8/1996 |
| JP | 11-18328/1999 | 1/1999 |
| JP | 411098793 A * | 4/1999 |

* cited by examiner

Primary Examiner—Nestor Ramirez
Assistant Examiner—Julio Gonzalez R.
(74) Attorney, Agent, or Firm—Rankin, Hill, Porter & Clark LLP

(57) ABSTRACT

An interior permanent magnet synchronous motor capable of significantly restraining cogging torque and torque pulsation during feeding of electricity thereto. Each of the outer peripheral surface sections of a rotor core and a magnetic pole surface of each of magnetic poles of a stator core are arranged so as to have a gap defined therebetween and having a size $\delta d$ which satisfies an expression $\delta d = \delta d0/\cos(p\theta d)$, wherein $\delta d0$ is a size of the gap which is determined along a virtual center line defined so as to extend through centers of two virtual lines extending from a center of a shaft through both ends of the outer peripheral surface section defined in a peripheral direction thereof and $\theta d$ is an angle between the virtual central line and each of the virtual lines.

13 Claims, 8 Drawing Sheets

INTERIOR PERMANENT MAGNET SYNCHRONOUS MOTOR

BACKGROUND OF THE INVENTION

This invention relates to an interior permanent magnet synchronous motor wherein a rotor core has a plurality of permanent magnets incorporated or embedded therein and includes magnetic salient pole sections defined between each adjacent two of the permanent magnets adjacent, and more particularly to a permanent magnet-equipped synchronous motor utilizing both reluctance generated due to the salient pole sections of the rotor core and torque by the permanent magnets.

One of conventional synchronous motors each having permanent magnets incorporated therein is disclosed in Japanese Patent Application Laid-Open Publication No. 18328/1999. The conventional synchronous motor disclosed is so constructed that a width of a core between magnetic poles of permanent magnets is set so as to establish relationship represented by the following expression, to thereby restrain generation of cogging torque:

$$\theta min \leq \theta \leq max\theta max$$

wherein θ is an open angle of the core of the magnetic poles of the permanent magnets, θ min is a minimum value of an angle defined by two straight lines obtained by connecting distal ends of two end surfaces maximumly spaced from each other of plural end surfaces of teeth corresponding to the width of the core and a center of a revolving shaft to each other, and θ max is a maximum value of an angle between two straight lines defined by connecting two ends maximumly spaced from each other of plural ends of teeth heads of the teeth corresponding to the width of the core and the center of the revolving shaft to each other.

Another conventional synchronous motor wherein a core between magnetic poles of permanent magnets is provided with magnetic salient pole sections is disclosed in Japanese Patent Application Laid-Open Publication No. 205499/1996. The synchronous motor is constructed in such a manner that rotation of a rotor is limited to only one direction, to thereby displace the salient pole sections, resulting in restraining generation of torque pulsation.

In the former synchronous motor disclosed in Japanese Patent Application Laid-Open Publication No. 18328/1999, the open angle θ is defined to be within a range of θmin≦θ≦max determined depending on the number of teeth, a configuration thereof and a size thereof. However, a timing at which torque is generated between the magnetic poles of the permanent magnets is varied depending on "the number of slots per pole and per phase" q of a stator, so that the synchronous motor fails to satisfactorily restrain cogging torque and torque pulsation.

In the latter synchronous motor disclosed in Japanese Patent Application Laid-Open Publication No. 205499/1996, it is required to displace the salient pole sections of the magnetic poles of the permanent magnets in a direction determined by the direction of rotation of the rotor. This causes the rotor to fail to freely repeat normal rotation and reverse rotation, resulting in failing to sufficiently restrain torque pulsation.

SUMMARY OF THE INVENTION

The present invention has been made in view of the foregoing disadvantage of the prior art.

Accordingly, it is an object of the present invention to provide a permanent magnet-equipped synchronous motor which is capable of sufficiently restraining both cogging torque and torque pulsation during feeding of electricity thereto.

In accordance with the present invention, a permanent magnet-equipped synchronous motor is provided. The permanent magnet-equipped synchronous motor includes a stator including a stator core provided with a plurality of magnetic pole sections having windings of at least one phase wound thereon, as well as a rotor of which the number of pole pairs is p (p: a positive integer of 1 or more). The rotor includes a shaft and a rotor core fixed on the shaft. The rotor core has a plurality of permanent magnets incorporated therein in a manner to be spaced from each other at intervals in a peripheral direction thereof. The permanent magnets each constitute a permanent magnet magnetic pole section formed on an outer periphery of the rotor core The rotor is formed with a plurality of magnetic salient pole sections so as to interpose the permanent magnet magnetic pole sections therebetween. The rotor core includes outer peripheral surface sections each positioned between each adjacent two of the magnetic salient pole sections. The magnetic poles of the stator core each include a magnetic pole surface. Each of the outer peripheral surface sections of the rotor core and the magnetic pole surface of each of the magnetic poles of the stator core are arranged so as to have a gap defined therebetween and having a size δd which satisfies the following expression:

$$\delta d = \delta d0 / \cos(p\theta d)$$

wherein δd0 is a size of the gap which is determined along a virtual center line defined so as to extend through centers of two virtual lines extending from a center of the shaft through both ends of the outer peripheral surface section defined in a peripheral direction thereof and θd is an angle between the virtual central line and each of the virtual lines.

The outer peripheral surface sections of the rotor core each may have a contour formed into an arcuate or elliptic configuration. In this instance as well, the arcuate or elliptic configuration may be so determined that a size of the gap has a value approaching to the value determined by the above-described expression.

The gap satisfying the above-described expression constitutes a so-called cosec gap. Such a gap configuration permits a distribution of density of a magnetic flux from the permanent magnets in the gap to approach a sinusoidal wave irrespective of a direction of rotation of the motor, to thereby restrain cogging torque.

The stator core may be so configured that when "the number of slots per pole and per phase" q of the stator core is an integer of 1 or more, an open angle α of the magnetic salient pole sections which is defined as an angle between two virtual lines defined so as to extend through a center of the shaft and both ends of each of the magnetic salient pole sections in a peripheral direction thereof is defined so as to satisfy an expression α≈n·τs wherein n is a natural number and τs is a slot pitch of the stator core. "The number of slots per pole and per phase" q may be found by an expression q=Ns/(2×p×m) wherein Ns is the number of slots, p is the number of pole pairs and m is the number of phases.

Also, the stator core may be so configured that when "the number of slots per pole and per phase" q of the stator core is a fraction of 1 or more, an open angle α of the magnetic salient pole sections which is defined as an angle between two virtual lines defined so as to extend through a center of the shaft and both ends of each of the magnetic salient pole sections in a peripheral direction thereof is defined so as to satisfy an expression α≈(n/2)τs wherein n is a natural number and τs is a slot pitch of the stator core.

Also, an angle φp between two virtual lines extending from a center of the shaft through both ends of each of the outer peripheral surface sections and an open angle α of the magnetic salient pole sections which is defined as an angle between two virtual lines extending through the center of the shaft and both ends of each of the magnetic salient pole sections in a peripheral direction thereof are defined so as to satisfy an expression $(180/p+\alpha-\phi p)/\tau s \approx 2n-1$ wherein τs is a slot pitch of the stator core, n is a natural number, α>0, φp >0, and $\alpha+\phi p \leq 180/p$.

In a motor wherein the gap does riot constitute a so-called cosec gap as well, torque pulsation may be satisfactorily restrained by setting the angles α and φp so as to permit the relationship described above to be established.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate like or corresponding parts throughout; wherein.

DETAILED DESCRIPTION OF THE PREFERRED EMBODIMENTS

Now, an interior permanent magnet synchronous motor or a permanent magnet-equipped synchronous motor according to the present invention will be described with reference to the accompanying drawings.

Figure 1:
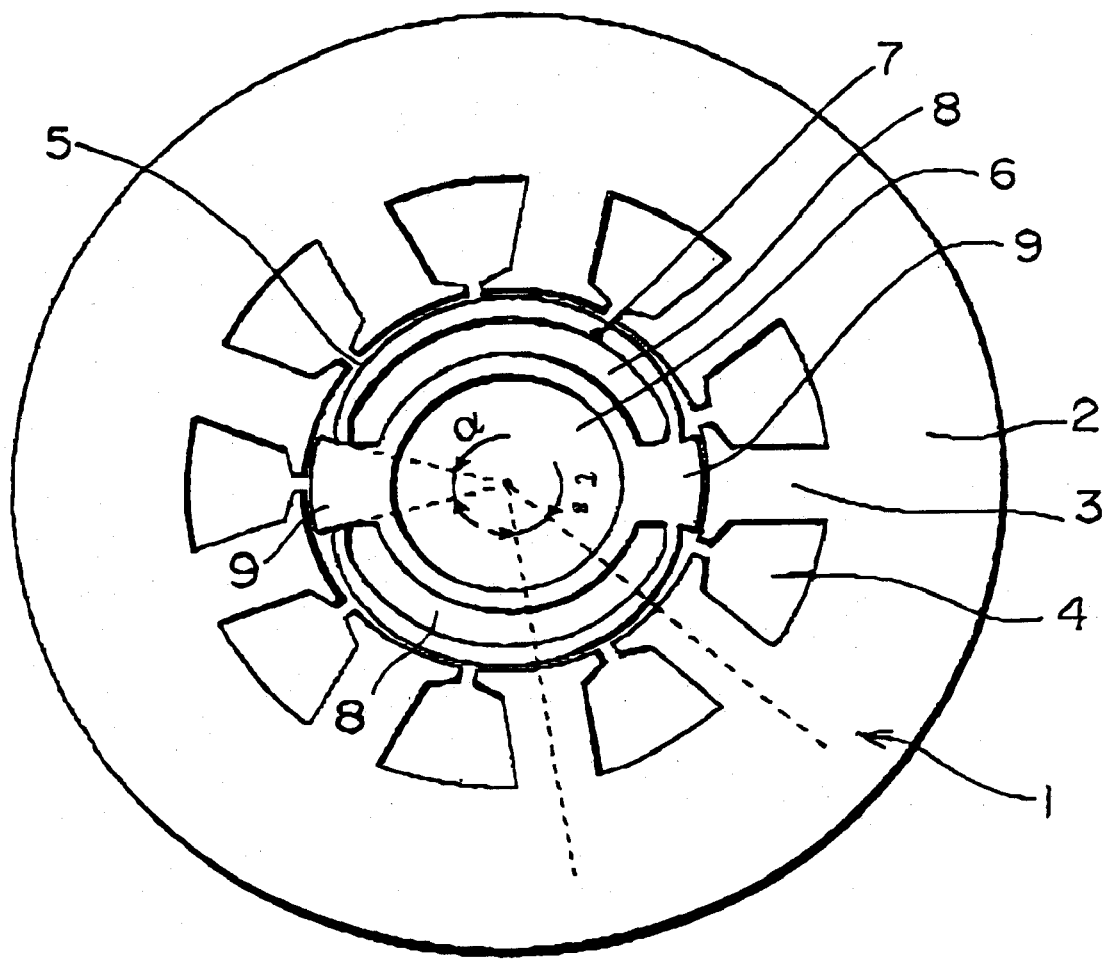
FIG. 1 is a schematic view conceptually showing a first embodiment of an interior permanent magnet synchronous motor or a permanent magnet-equipped synchronous motor according to the present invention.

Referring first to FIG. 1, a stator/rotor structure incorporated in an embodiment of a synchronous motor with built-in permanent magnets or an interior permanent magnet synchronous motor according to the present invention is illustrated. An interior permanent magnet synchronous motor of the illustrated embodiment, as shown in FIG. 1, includes a stator 1, which includes an annular yoke 2 constructed by laminating a plurality of silicon steel plates on each other. The annular yoke 2 has a plurality of teeth 3 formed on an inner periphery thereof in a manner to be spaced from each other at predetermined intervals in a peripheral direction thereof. The teeth 3 each constitute a magnetic pole section. The teeth 3 are so arranged that each adjacent two thereof have a slot 4 defined therebetween. The teeth 3 have three-phase windings wound thereon in order, resulting in forming winding sections (not shown). The yoke 2 and teeth 3 cooperate with each other to constitute a stator core.

The permanent magnet-equipped synchronous motor of the illustrated embodiment also includes a rotor 5. The rotor 5 includes a shaft 6, as well as a rotor core 7 fixed on the shaft 6 and having two permanent magnets 8 incorporated therein in a manner to be spaced from each other at an interval in a peripheral direction thereof. The rotor 5 includes magnetic salient pole sections 9 defined between the two permanent magnets 8. The rotor core 7 is likewise constructed by laminating silicon steel plates on each other. Also, the rotor core 7 has through-holes formed at portions thereof at which the permanent magnets 8 are incorporated in the rotor core 7, so that the permanent magnets 8 may be inserted via the through-holes into the rotor core 7. The permanent magnets 8 each are formed into an arcuate shape in cross section. In the illustrated embodiment, the stator is so configured that the number of slots Ns is set to be nine (9), the number of pole pairs is one (1), and the number of phases is three (3). Thus, "the number of slots per pole and per phase" q is permitted to be q=9/(2×1×3)=1.5. Also, a slot pitch τs is 40 degrees (τs=40°). The number of pole pairs p is 1 (p=1).

Figure 2:
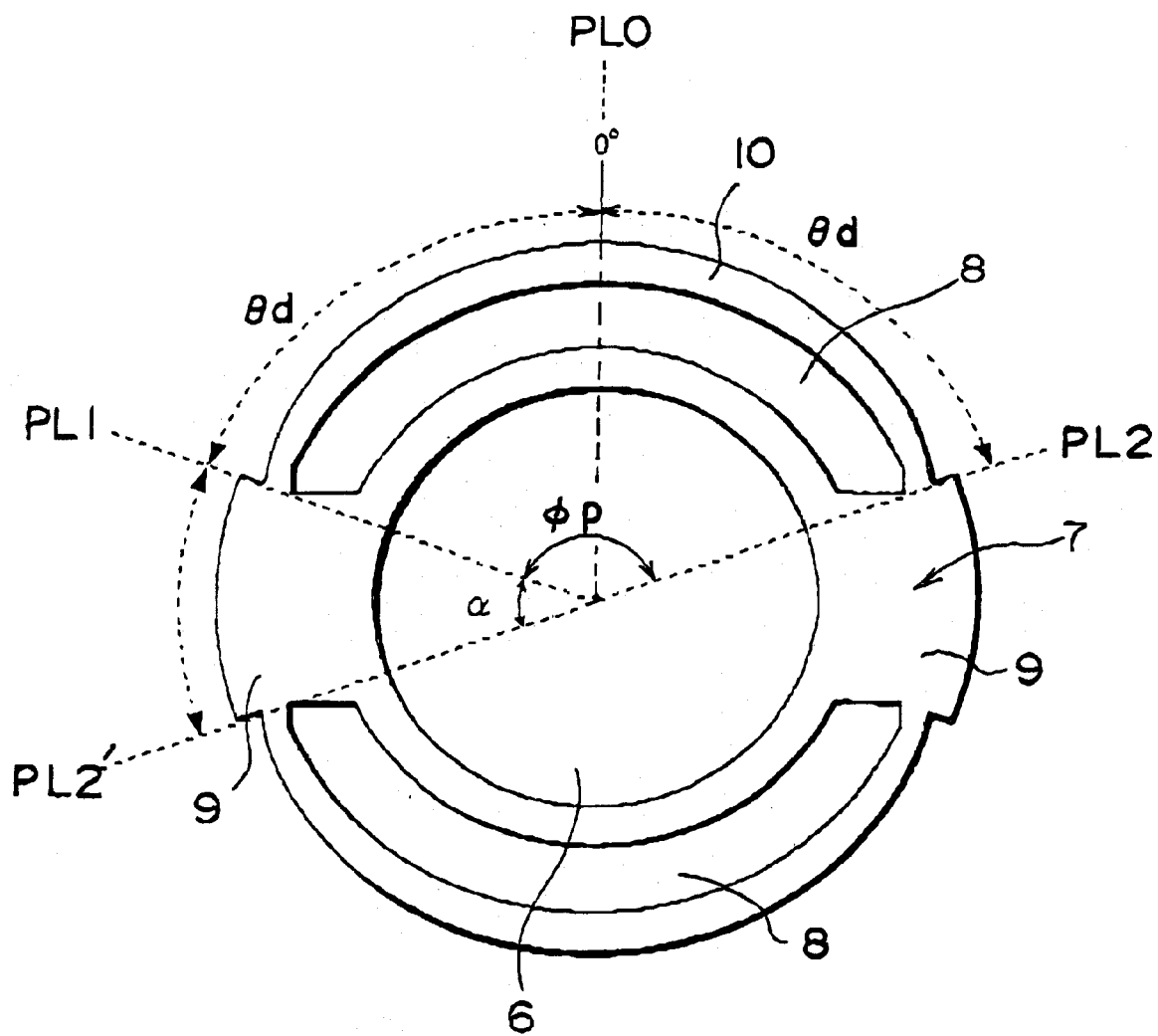
FIG. 2 is a schematic view conceptually showing a rotor incorporated in the interior permanent magnet synchronous motor shown in FIG. 1.

The rotor 5 will be described more in detail with reference to FIG. 2. The rotor core 7 includes outer peripheral surface sections 8a each positioned between each adjacent two of the magnetic salient pole sections 9. The magnetic poles or teeth 3 of the stator core each include a magnetic pole surface. The outer peripheral surface sections 8a of the rotor core each are so configured that a gap defined between each of the outer peripheral surface sections 8a of the rotor core 7 positioned between two virtual lines PL1 and PL2 respectively extending from a center of the shaft 6 through both ends of each of the outer peripheral surface sections 8a in a peripheral direction thereof and the magnetic pole surface of each of the magnetic poles or teeth 3 of the senator core may have a size δd satisfying the following expression (1):

$$\delta d = \delta d0 / \cos(p\theta d) \quad (1)$$

wherein δd0 is a size of the gap which is determined along a virtual central line PL0 defined so as to extend through centers of the two virtual lines PL1 and PL2 and θd is an angle between the virtual central line PL0 and each of the virtual lines PL1 and PL2.

In the illustrated embodiment, "the number of slots per pole and per phase" q of the stator core is defined to be a fraction of 1.5 and an open angle α of the magnetic salient pole sections 9 which is defined as an angle between two virtual lines PL1 and PL2' defined so as to extend through both ends of each of the magnetic salient pole sections 9 between the two permanent magnets 8 defined in a peripheral direction thereof and the center of the shaft 6 is defined so as to satisfy the following expression (2):

$$\alpha \approx (n/2)\tau s \quad (2)$$

wherein n is a natural number and τs is a slot pitch of the stator core. In the illustrated embodiment, n and τs are defined to be 2 and 40°, respectively, so that the open angle α may be defined to be about 40°. Setting of the open angle α at an angle approximating each of 20°, 40°, 60°, 80° . . . permits torque pulsation to be sufficiently restrained.

Figure 3:
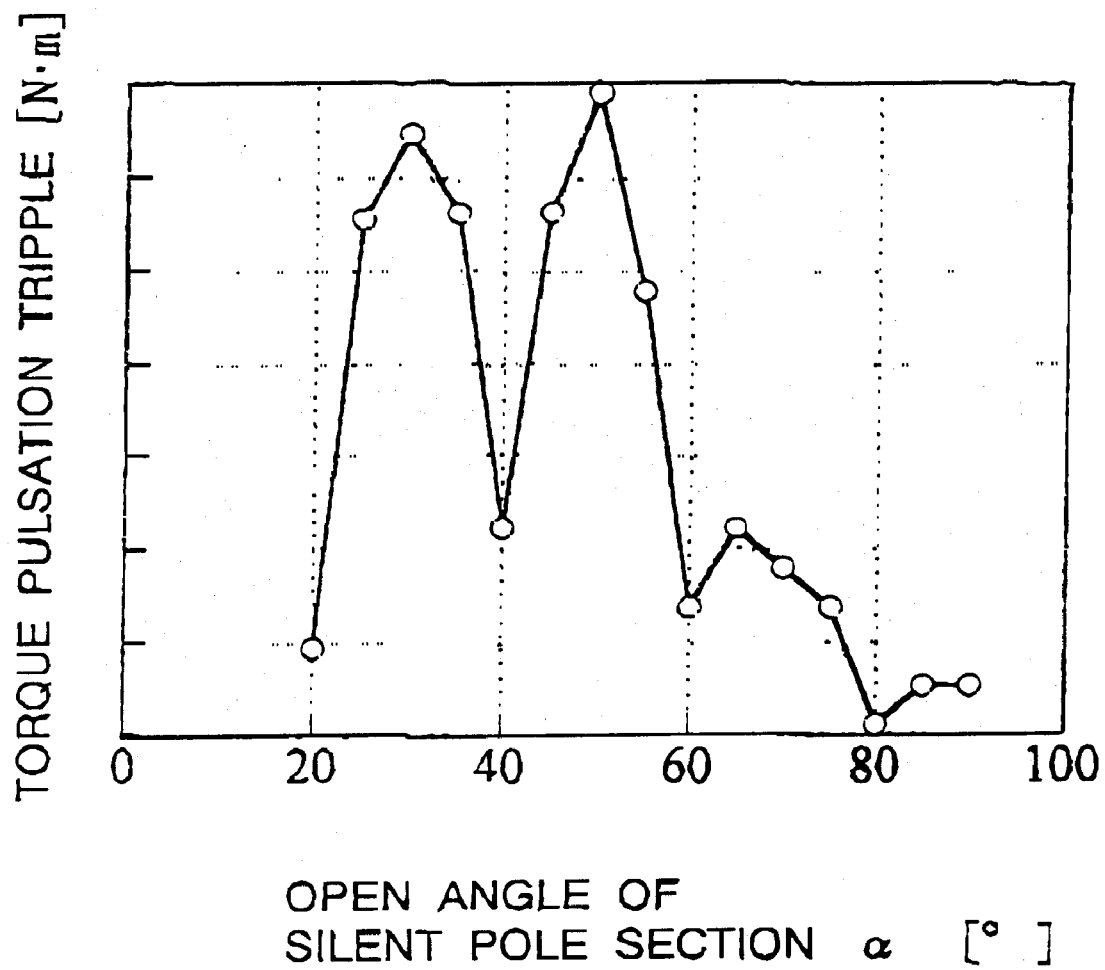
FIG. 3 is a graphical representation showing relationship between an open angle of a salient pole section and a variation in torque pulsation in the interior permanent magnet synchronous motor of FIG. 1.

FIG. 3 shows relationship between the open angle α and torque pulsation in the illustrated embodiment. FIG. 3 indicates that setting of the open angle α at an angle of each of 20°, 40°, 60°, 80° minimizes torque pulsation. A range indicated by the expression (2) described above is associated with a slot opening. In the illustrated embodiment, the slot opening w which is a width of an opening of the slot 4 which is defined on a side of an inner periphery thereof is defined to be 4.5 degrees (w=4.5°), so that a minimum value of the torque pulsation is present within a range of $(n/2) \cdot \tau s - 2.25° \leq \alpha \leq (n/2) \cdot s + 2.25°$.

In the illustrated embodiment, the outer peripheral surface section defined between each adjacent two of the magnetic salient pole sections may be contoured into an arcuate or elliptic configuration. Formation of such an arcuate or elliptic shape may be carried out so as to permit a value approximating a value determined by the above-described expression to be obtained.

Figure 4:
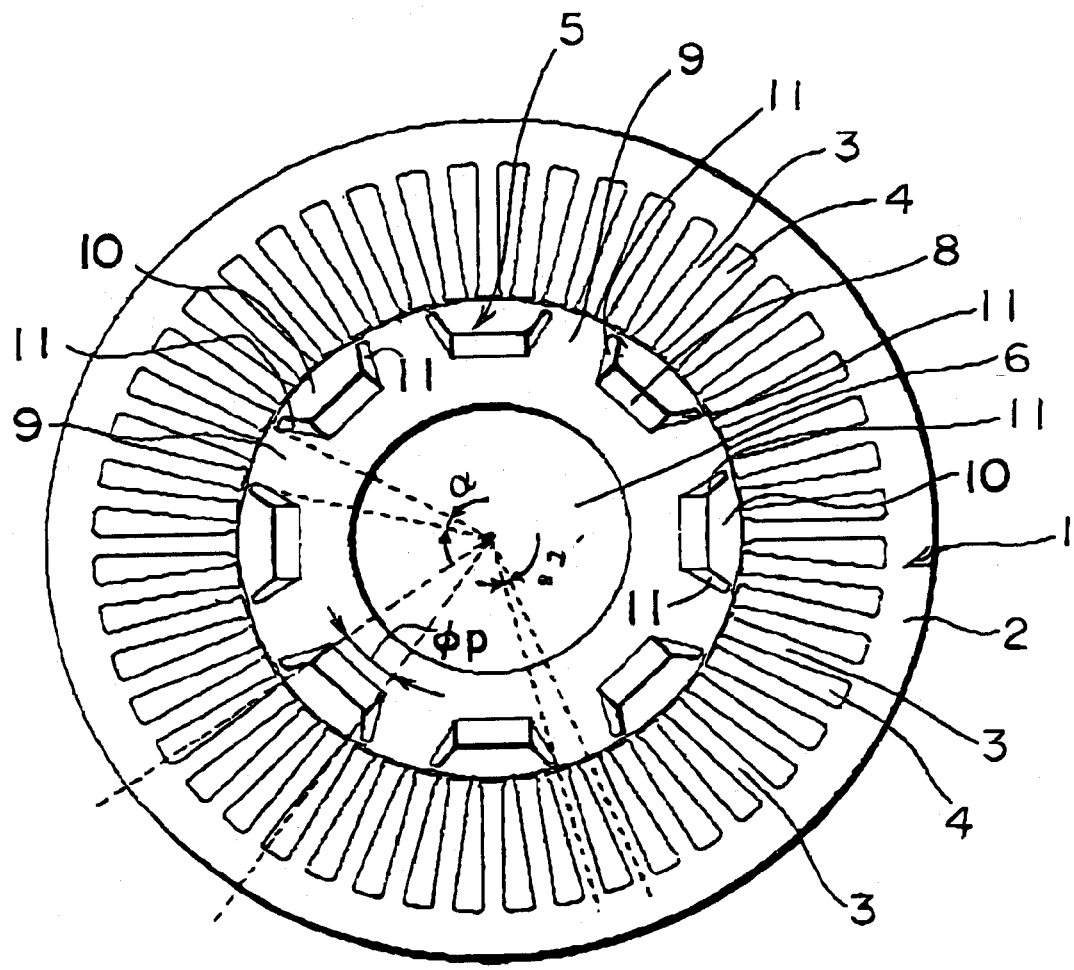
FIG. 4 is a schematic view conceptually showing a second embodiment of an interior permanent magnet synchronous motor according to the present invention.
Figure 5:
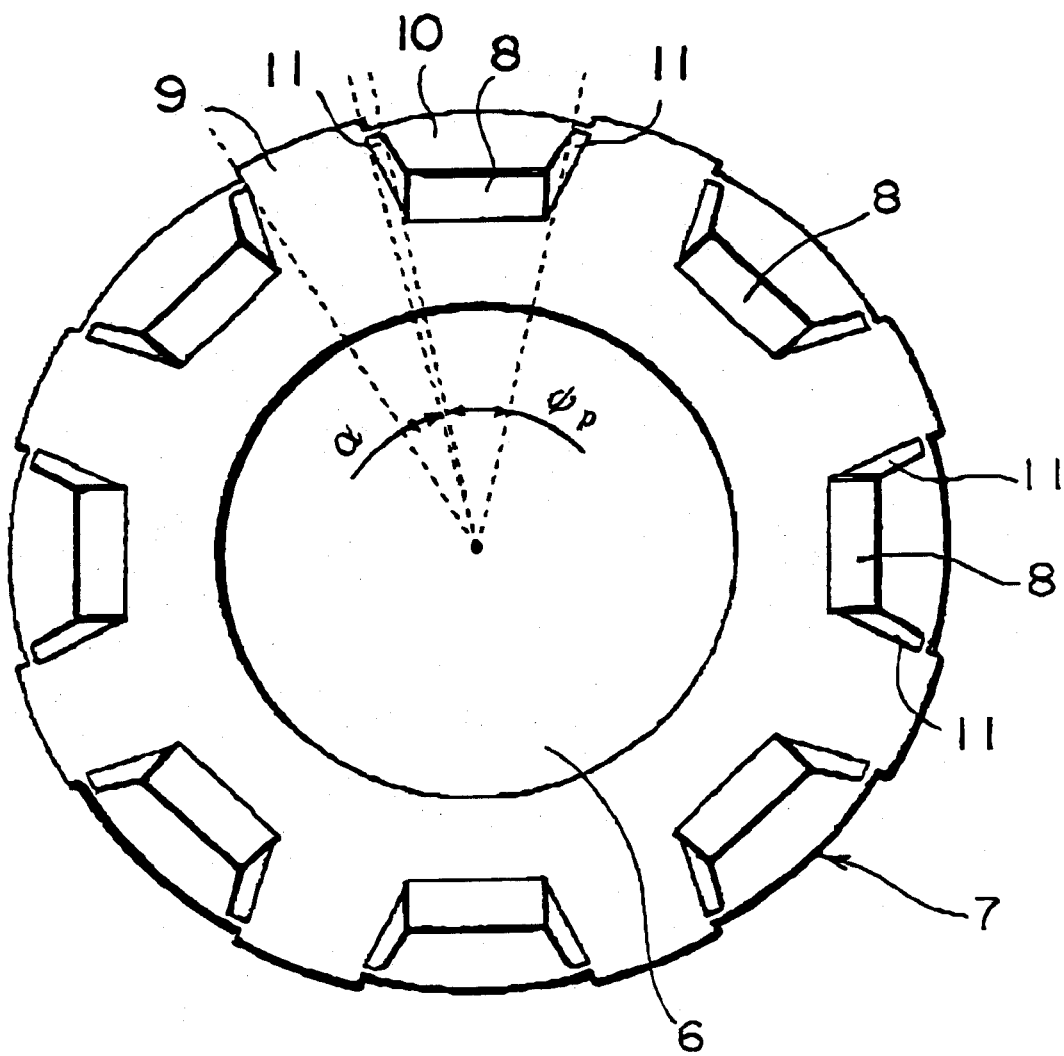
FIG. 5 is a schematic view conceptually showing a rotor incorporated in the interior permanent magnet synchronous motor shown in FIG. 4.

Referring now to FIGS. 4 and 5, a second embodiment of an interior permanent magnet synchronous motor or a permanent magnet-equipped synchronous motor according to the present invention is illustrated. An interior permanent magnet synchronous motor of the illustrated embodiment is configured in such a manner that "the number of slots per pole and per phase" q is set to be 2 (q=2), a slot pitch τs is 7.5° (τs=7.5°) and the number of pole pairs p is 4 (p=4). The synchronous motor of the illustrated embodiment thus configured is directed to the case that "the number of slots per pole and per phase" q is an integer of 1 or more. For this purpose, the illustrated embodiment is so constructed that permanent magnets 8 formed into a parallelopiped shape each are provided on each of both lateral sides thereof with a non-magnetic section 11, which is made of air, aluminum or the like so as to prevent intrusion of a magnetic flux from the permanent magnet 8. In this instance, an angle φp of a rotor core constituting permanent magnet magnetic pole sections 10 is set to be substantially equal to an angle between inner angular sections of two non-magnetic sections 11 near an outer peripheral surface of a rotor, unlike the first embodiment described above. At least outer peripheral surface sections of the rotor core 7 constituting the permanent magnet magnetic pole sections 10 each are preferably formed into a configuration which permits formation of a cosec gap so as to satisfy the above-described expression (1), as in the first embodiment described above. In the illustrated embodiment, the outer peripheral surface section of the rotor core 7 defined between each adjacent two salient pole sections 9 is formed into a shape which permits formation of a so-called cosec gap so as to meet the above-described expression (1).

Figure 6:
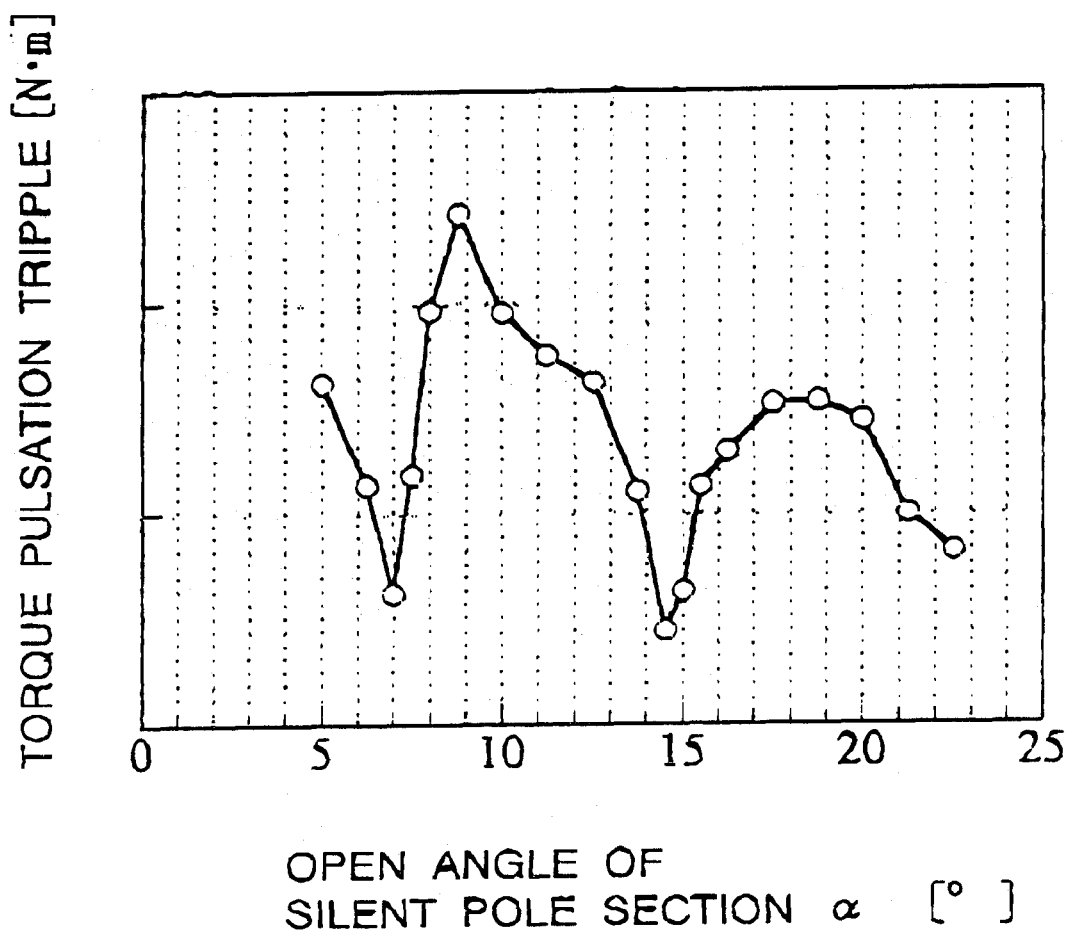
FIG. 6 is a graphical representation showing relationship between an open angle of a salient pole section and a variation in torque pulsation in the interior permanent magnet synchronous motor shown in FIG. 4.

When "the number of slots per pole and per phase" q of a stator core is an integer of 1 or more as in the illustrated embodiment, an open angle α of the magnetic salient pole sections 9 which is defined to be an angle between two virtual lines defined so as to extend through two ends of the magnetic salient pole section formed between each adjacent two permanent magnets 8 in a peripheral direction thereof and a center of a shaft 6 is defined so as to satisfy the following expression (3):

$$\alpha \approx n \cdot \tau s \qquad (3)$$

α obtained by the expression (3) described above preferably has a value approximating 7.5°, 15°, 22.5° . . . Such a value leads to restriction of torque pulsation. Relationship between α and the torque pulsation in the illustrated embodiment is shown in FIG. 6, which indicates that α at each of 7° and 14.5° permits the torque pulsation to be minimized. Thus, a minimum value of the torque pulsation is present at a position somewhat deviated from each of 7.5° and 15°. Thus, a minimum value of the torque pulsation is present within a range of a slot opening W or within a range of $(n \cdot \tau s) - w/2 \leq \alpha \leq (n \cdot \tau s) + w/2$. In the illustrated embodiment, the slow opening w is 2.1° (w=2.1°).

Figure 7:
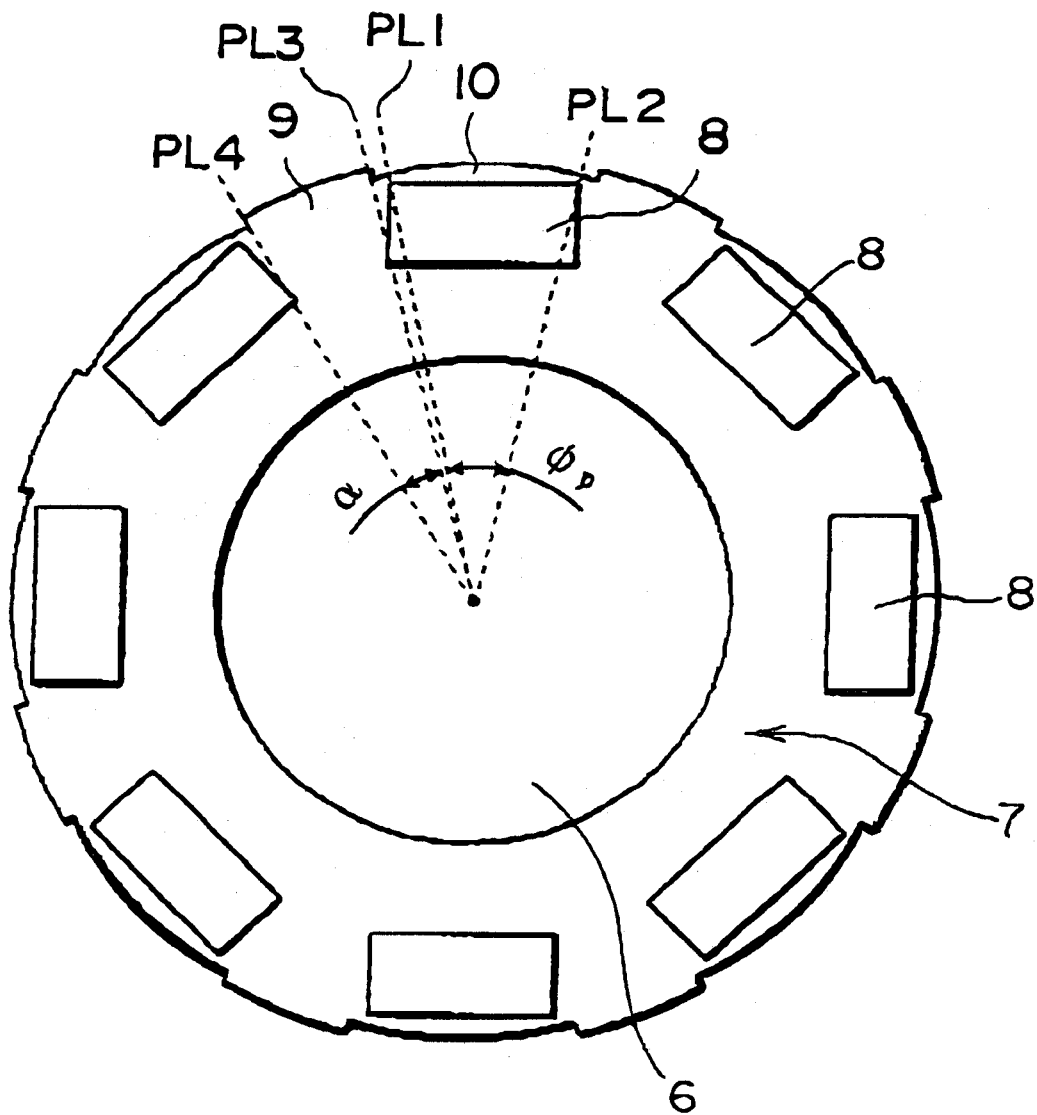
FIG. 7 is a schematic view conceptually showing a rotor incorporated in a third embodiment of an interior permanent magnet synchronous motor according to the present invention.

Referring now to FIG. 7, a rotor incorporated in a third embodiment of a permanent magnet-equipped synchronous motor according to the present invention is illustrated. An interior permanent magnet synchronous motor of the illustrated embodiment is so configured that the number of pole pairs p is set to be 4 (p=4). The synchronous motor of the illustrated embodiment is so constructed that permanent magnets 8 formed into a parallelopiped shape are embedded in a rotor core 7. However, the permanent magnets 8 each are not provided on each of both sides thereof in a peripheral direction thereof with a non-magnetic section. In the illustrated embodiment as well, outer peripheral surface sections of the rotor core constituting permanent magnet magnetic pole sections 10 each are formed into a configuration which permits formation of a so-called cosec gap.

In the illustrated embodiment, an open angle φp of the permanent magnet magnetic pole sections 10 is defined to be an angle between virtual lines PL1 and PL2 defined by connecting two angular portions of each of the permanent magnets 8 positioned on an outside of the permanent magnet 8 in peripheral and radial directions thereof and a center of a shaft 6 to each other. Also, an open angle α of salient pole sections 9 is an angle between virtual lines PL3 and PL4 defined so as to extend through two angular portions of each adjacent two permanent magnets positioned opposite to each other while being positioned outwardly in a peripheral direction thereof and inwardly in a radial direction thereof and the center of shaft 6. In the illustrated embodiment, the open angles φp and α are determined so as to satisfy the following expression (4):

$$(180/p + \alpha - \phi p)/\tau s \approx 2n - 1 \qquad (4)$$

wherein τs is a slot pitch of the stator core and n is a natural number. Also, α and φp are selected to ensure α>0, φp>0 and α+φp≦180/p. Such relationship ensures sufficient restraining of torque pulsation.

Figure 8:
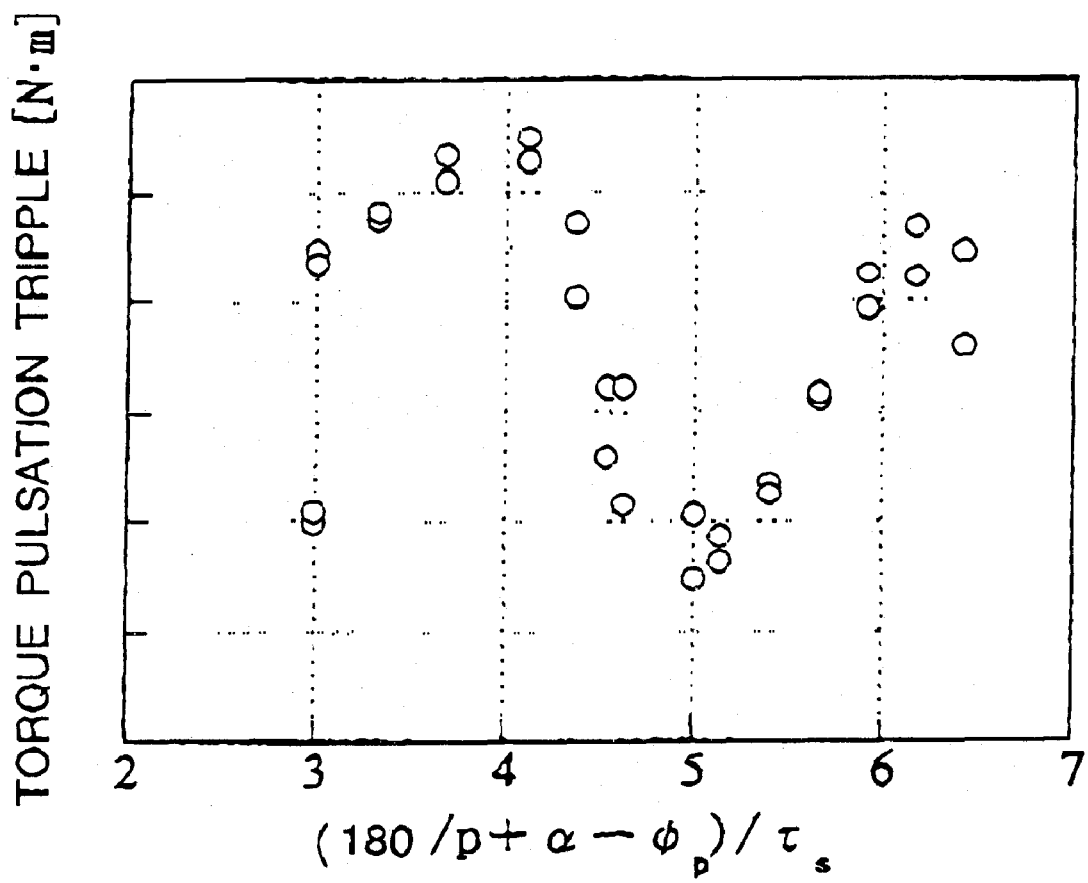
FIG. 8 is a graphical representation showing relationship between torque pulsation and $(180/p+\alpha-\phi p)/\tau s$ which is obtained when the rotor shown in FIG. 7 is used.

In the illustrated embodiment, the open angle φp of the permanent magnet magnetic pole sections 10 and the open angle α of the salient pole sections 9 are set so as to satisfy the above-described expression (4). In the illustrated embodiment, restraining of the torque pulsation may be attained when the open angles α and φp are set so as to permit a left side of the above-described expression (4) to have a value approximating each of 1, 3, 5, 7, . . . Relationship between the left side of the expression (4) and the torque pulsation is shown in FIG. 8, which indicates that the torque is minimized when the left side has a value approximating each of 3 and 5. A range represented by the expression (4) is substantially associated with a slot opening. In this instance, w is 2.1° and τs is 7.5°, so that the torque pulsation is minimized when the left side of the expression (4) is within a range of ±w/τs (=0.28) or in the following expression (5):

$$(2n-1) - 0.28 \leq (1/\tau s)(180/p + \alpha - \phi p) \leq (2n-1) + 0.28 \qquad (5)$$

Relationship of the above-described expression (4) may be also applied to the case that the gap essential in the first embodiment does not constitute a so-called cosec gap. When the relationship is satisfied, the torque pulsation is permitted to be minimized.

As can be seen from the foregoing, the present invention effectively attains restraining of cogging torque, as well as retraining of torque pulsation.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An interior permanent magnet synchronous motor comprising:
    a stator including a stator core provided with a plurality of magnetic pole sections having windings wound thereon;
    a rotor of which the number of pole pairs is p, wherein p is a positive integer of 1 or more;
    said rotor including a shaft and a rotor core fixed on said shaft;
    said rotor core having a plurality of permanent magnets incorporated therein in a manner to be spaced from each other at intervals in a peripheral direction thereof;
    said permanent magnets each constituting a permanent magnet magnetic pole section formed on an outer periphery of said rotor core;
    said rotor being formed with a plurality of magnetic salient pole sections so as to interpose said permanent magnet magnetic pole section therebetween;
    said rotor core including outer peripheral surface sections each positioned between each adjacent two of said magnetic salient pole sections;
    said magnetic pole sections of said stator core each including a magnetic pole surface; and
    each of said outer peripheral surface sections of said rotor core and said magnetic pole surface of each of said magnetic pole sections of said stator core being arranged so as to have a gap defined in a peripheral direction therebetween and having a size, $\delta d$, which satisfies the following expression:

$$\delta d = \delta d0 / \cos(p\theta d)$$

wherein $\delta d0$ is a size of said gap which is determined along a virtual central line defined so as to extend through centers of two virtual lines extending from a center of said shaft through both ends of said outer peripheral surface section defined in a peripheral direction thereof and $\theta d$ is an angle between said virtual central line and each of said virtual lines.

2. The interior permanent magnet synchronous motor as defined in claim 1, wherein said stator core is so configured that when "the number of slots per pole and per phase" q of said stator core is an integer of 1 or more, an open angle $\alpha$ of the magnetic salient pole sections, which is defined as an angle between two virtual lines defined so as to extend through a center of said shaft and both ends of each of said magnetic salient pole sections in a peripheral direction thereof, is defined so as to satisfy the following expression:

$$\alpha \approx n \tau s$$

wherein n is a natural number and $\tau s$ is a slot pitch of said stator core.

3. The interior permanent magnet synchronous motor as defined in claim 1, wherein said stator core is so configured that when "the number of slots per pole and per phase" q of said stator core is a fraction of 1 or more, an open angle $\alpha$ of the magnetic salient pole sections, which is defined as an angle between two virtual lines defined so as to extend through a center of said shaft and both ends of each of said magnetic salient pole sections in a peripheral direction thereof, is defined so as to satisfy the following expression:

$$\alpha \approx (n/2) \tau s$$

wherein n is a natural number and $\tau s$ is a slot pitch of said stator core.

4. The interior permanent magnet synchronous motor as defined in claim 1, wherein an angle $\phi p$ between two virtual lines extending from a center of said interpose said permanent magnet magnetic pole section therebetween;
    said rotor core including an outer peripheral surface sections each positioned between each adjacent two of said magnetic salient pole sections;
    said outer peripheral surface sections of said rotor core each having a contour formed into an arcuate or elliptic configuration; and
    said arcuate or elliptic configuration being so determined that said outer peripheral surface section of said rotor core and said magnetic pole surface of each of said magnetic poles of said stator core cooperate with each other to define in a peripheral direction therebetween a gap of a size $\delta d$ approaching to a value determined by the following expression:

$$\delta d = \delta d0 / \cos(p\theta d)$$

wherein $\delta d0$ is a size of said gap which is determined along a virtual central line defined so as to extend through centers of two virtual lines extending from a center of said shaft through both ends of each of said outer peripheral surface sections defined in a peripheral direction thereof and $\theta d$ is an angle between said virtual central line and each of said virtual lines.

5. An interior permanent magnet synchronous motor as defined in claim 4, wherein when "the number of slots per pole and per phase" q of said stator core is an integer of 1 or more, said open angle $\alpha$ is determined by an expression $\alpha \approx n \tau s$, wherein n is a natural number and $\tau s$ is a slot pitch of said stator core.

6. An interior permanent magnet synchronous motor as defined claim 4, wherein when "the number of slots per pole and per phase" q of said stator core is a fraction of 1 or more, said open angle $\alpha$ is determined by an expression: $\alpha \approx (n/2) \tau s$, wherein n is a natural number and $\tau s$ is a slot pitch of said stator core.

7. An interior permanent magnet synchronous motor comprising:
    a stator including a stator core provided with a plurality of magnetic pole sections having windings of at least one phase wound thereon;
    a rotor of which the number of pole pairs is p (p: a positive integer of 1 or more);
    said rotor including a shaft and a rotor core fixed on said shaft;
    said rotor core having a plurality of permanent magnets incorporated therein in a manner to be spaced from each other at intervals in a peripheral direction thereof;
    said permanent magnets each constituting a permanent magnet magnetic pole section formed on an outer periphery of said rotor core;

said rotor being formed with a plurality of magnetic silent pole sections so as to interpose said permanent magnet magnetic pole section therebetween;

said rotor core including an outer peripheral surface sections each positioned between each adjacent two of said magnetic silent pole sections;

said outer peripheral surface sections of said rotor core each having a contour formed into an arcuate or elliptic configuration; and said arcuate or elliptic configuration being so determined that said outer peripheral surface section of said rotor core and said magnetic pole surface of each of said magnetic poles of said stator core cooperate with each other to define therebetween a gap of a size $\delta d$ approaching to a value determined by the following expression:

$$\delta d = \delta d0 / \cos(p\theta d)$$

wherein $\delta d0$ is a size of said gap which is determined along a virtual central line defined so as to extend through centers of two virtual lines extending from a center of said shaft through both ends of each of said outer peripheral surface sections defined in a peripheral direction thereof and $\theta d$ is an angle between said virtual central line and each of said virtual lines.

8. The interior permanent magnet synchronous motor as defined in claim 7, wherein said stator core is so configured that when "the number of slots per pole and per phase" q of said stator core is an integer of 1 or more, an open angle $\alpha$ of the magnetic salient pole sections, which is defined as an angle between two virtual lines defined so as to extend through a center of said shaft and both ends of each of said magnetic salient pole sections in a peripheral direction thereof, is defined so as to satisfy the following expression:

$$\alpha \approx n \cdot \tau s$$

wherein n is a natural number and $\tau s$ is a slot pitch of said stator core.

9. The interior permanent magnet synchronous motor as defined in claim 7, wherein said stator core is so configured that when "the number of slots per pole and per phase" q of said stator core is a fraction of 1 or more, an open angle $\alpha$ of the magnetic salient pole sections, which is defined as an angle between two virtual lines defined so as to extend through a center of said shaft and both ends of each of said magnetic salient pole sections in a peripheral direction thereof, is defined so as to satisfy the following expression:

$$\alpha \approx (n/2)\tau s$$

wherein n is a natural number and $\tau s$ is a slot pitch of said stator core.

10. The interior permanent magnet synchronous motor as defined in claim 7, wherein an angle $\phi p$ between two virtual lines extending from a center of said shaft through both ends of each of said outer peripheral surface sections in a peripheral direction thereof and an open angle $\alpha$ of said magnetic salient pole sections which is defined as an angle between two virtual lines extending through the center of said shaft and both ends of each of said magnetic salient pole sections in a peripheral direction thereof are defined so as to satisfy the following expression:

$$(180/p + \alpha - \phi p)/\tau s \approx 2/n - 1$$

wherein $\tau s$ is a slot pitch of said stator core, n is a natural number, $\alpha > 0$, $\phi p > 0$, and $\alpha + \phi p \leq 180/p$.

11. The interior permanent magnet synchronous motor as defined in claim 10, wherein when "the number of slots per pole and per phase" q of said stator core is an integer of 1 or more, said open angle $\alpha$ is determined by an expression $\alpha \approx n \cdot \tau s$, wherein n is a natural number and $\tau s$ is a slot pitch of said stator core.

12. The interior permanent magnet synchronous motor as defined in claim 10, wherein when "the number of slots per pole and per phase" q of said stator core is a fraction of 1 or more, said open angle $\alpha$ is determined by an expression $\alpha \approx (n/2)\tau s$, wherein n is a natural number and $\tau s$ is a slot pitch of said stator core.

13. An interior permanent magnet synchronous motor comprising:

a stator including a stator core provided with a plurality of magnetic pole sections having windings wound thereon;

a rotor of which the number of pole pairs is p, wherein p is a positive integer of 1 or more;

said rotor including a shaft and a rotor core fixed on said shaft;

said rotor core having a plurality of permanent magnets incorporated therein in a manner to be spaced from each other at intervals in a peripheral direction thereof;

said permanent magnets each constituting a permanent magnet magnetic pole section formed on an outer periphery of said rotor core;

said rotor being formed with a plurality of magnetic salient pole sections so as to interpose said permanent magnet magnetic pole sections therebetween;

said rotor core including outer peripheral surface sections each positioned between each adjacent two of said magnetic salient pole sections; and said rotor being configured so that an angle $\phi p$ between two virtual lines extending from a center of said shaft through both ends of each of said outer peripheral surface sections defined in a peripheral direction thereof and an open angle $\alpha$ of the magnetic salient pole sections which is defined as an angle between two virtual lines extending through the center of said shaft and both ends of each of said magnetic salient pole sections in a peripheral direction thereof are defined so as to satisfy the following expression:

$$(180/p + \alpha - \phi p)/\tau s \approx 2n - 1$$

wherein $\tau s$ is a slot pitch of said stator core, n is a natural number, $\alpha > 0$, $\phi p > 0$, and $\alpha + \phi p \leq 180/p$.

* * * * *

UNITED STATES PATENT AND TRADEMARK OFFICE
CERTIFICATE OF CORRECTION

PATENT NO. : 6,486,581 B2
DATED : November 26, 2002
INVENTOR(S) : Toshihito Miyashita et al.

It is certified that error appears in the above-identified patent and that said Letters Patent is hereby corrected as shown below:

Column 1,
Line 23, delete "$\theta min \leq \theta \leq \theta max \theta max$" and insert -- $\theta min \leq \theta \leq \theta max$ --.
Line 47, delete "$\theta min \leq \theta \leq max$" and insert -- $\theta min \leq \theta \leq \theta max$ --.

Column 3,
Line 11, delete "riot" and insert -- not --.

Column 4,
Line 44, delete "senator" and insert -- stator --.

Column 5,
Lines 13-14, delete "$(n/2)\cdot \tau s-2.25° \leq \alpha \leq (n/2)\cdot s+2.25°$" and insert -- $(n/2)\cdot \tau s-2.25° \leq \alpha \leq (n/2)\cdot \tau s+2.25°$ --.

Column 8,
Lines 13-39, please delete Claim 4 in its entirety and replace it with the following:

-- The interior permanent magnet synchronous motor as defined in claim 1, wherein an angle $\phi p$ between two virtual lines extending from a center of said shaft through both ends of each of said outer peripheral surface sections in a peripheral direction thereof and an open angle $\alpha$ of said magnetic salient pole sections which is defined as an angle between two virtual lines extending through the center of said shaft and both ends of each of said magnetic salient pole sections in a peripheral direction thereof are defined so as to satisfy the following expression:

$$(180/p + \alpha - \phi p)/\tau s \approx 2n-1$$

wherein $\tau s$ is a slot pitch of said stator core, n is a natural number, $\alpha > 0$, $\phi p > 0$, and $\alpha + \phi p \leq 180/p$. --.

Lines 40 and 46, delete "An" and insert -- The --.
Lines 55-56, after "windings", delete "of at least one phase".
Lines 57-58, delete "(p: a positive Integer of 1 or more);" and insert -- , wherein p is a positive integer of 1 or more; --.

UNITED STATES PATENT AND TRADEMARK OFFICE
CERTIFICATE OF CORRECTION

PATENT NO. : 6,486,581 B2
DATED : November 26, 2002
INVENTOR(S) : Toshihito Miyashita et al.

It is certified that error appears in the above-identified patent and that said Letters Patent is hereby corrected as shown below:

Column 9,
Lines 1 and 6, delete "silent" and insert -- salient --.
Line 14, after "a", insert -- in a peripheral direction --.

Column 10,
Line 5, delete "$(180/p+ \alpha-\phi p)/\tau s \approx 2/n-1$" and insert -- $(180/p+ \alpha-\phi p)/ \tau s \approx 2n-1$ --.

Signed and Sealed this

Sixth Day of May, 2003

JAMES E. ROGAN
*Director of the United States Patent and Trademark Office*